United States Patent [19]

Adams

[11] Patent Number: 4,768,397
[45] Date of Patent: Sep. 6, 1988

[54] LUBRICATION SCHEME FOR PRESSURE LUBRICATED CRANKSHAFTS WITH COUNTERWEIGHT HOLES FOR CRANKSHAFT BALANCE

[75] Inventor: Gar M. Adams, Elkhart Lake, Wis.

[73] Assignee: Tecumseh Products Compny, Tecumseh, Mich.

[21] Appl. No.: 392,959

[22] Filed: Jun. 28, 1982

[51] Int. Cl.⁴ .............................................. F16C 3/14
[52] U.S. Cl. .......................................... 74/603; 74/605
[58] Field of Search ................... 74/605, 603; 417/902; 123/196 W

[56] References Cited

U.S. PATENT DOCUMENTS

| | | | |
|---|---|---|---|
| 344,930 | 7/1886 | Woodbury | 74/604 |
| 1,354,852 | 10/1920 | Schneider | 74/595 X |
| 1,511,200 | 10/1924 | Jerome | 74/605 |
| 1,618,870 | 2/1927 | Fedden et al. | 74/605 |
| 1,777,341 | 10/1930 | Weaver | 74/604 |
| 1,863,667 | 6/1932 | Miranda | 74/602 X |
| 1,874,444 | 8/1932 | Carvelli | 74/605 |
| 2,196,422 | 4/1940 | Meyer | 74/605 |
| 2,289,124 | 7/1942 | Karey | 123/196 W |
| 2,419,408 | 4/1947 | Lightowler | 74/605 |
| 2,524,207 | 10/1950 | Palmer | 74/603 |
| 2,917,946 | 12/1959 | Fritz | 74/605 X |
| 2,963,217 | 9/1961 | Wysong | 74/605 X |
| 3,513,721 | 5/1970 | Valbjorn et al. | 74/603 |
| 3,673,651 | 7/1972 | Stewart | 29/6 |
| 4,372,258 | 2/1983 | Iwai | 123/196 W |

FOREIGN PATENT DOCUMENTS 87035 11/1936 Sweden ..................... 123/196 W

OTHER PUBLICATIONS

FIG. 6-32, Litho Service Manual, p. 6-3-7, 12/76.

Primary Examiner—Gary L. Smith
Assistant Examiner—Rodney M. Lindsey
Attorney, Agent, or Firm—Jeffers, Hoffman & Niewyk

[57] ABSTRACT

Method and apparatus for counterbalancing an internal combustion engine while maintaining a lubricant flow path for supplying lubricant to a crankshaft connecting rod journal is disclosed wherein a generally cylindrical mass of crankshaft material is removed from a region of the crankshaft located coaxial with the connecting rod journal for engine balancing purposes with that removed mass including a portion of the lubricant passageway which supplies lubricant to the connecting rod journal. The region is then bridged by a tubular lubricant conduit to re-establish the lubricant path to the journal. Preferably the lubricant conduit is tubular and press fit into the existing passageway portions on opposite sides of the region with the lubricant passageway typically being a hole of uniform circular cross section extending oblique to the crankshaft axis of rotation and with the hole inside diameter substantially matching the outside diameter of the tube.

5 Claims, 1 Drawing Sheet

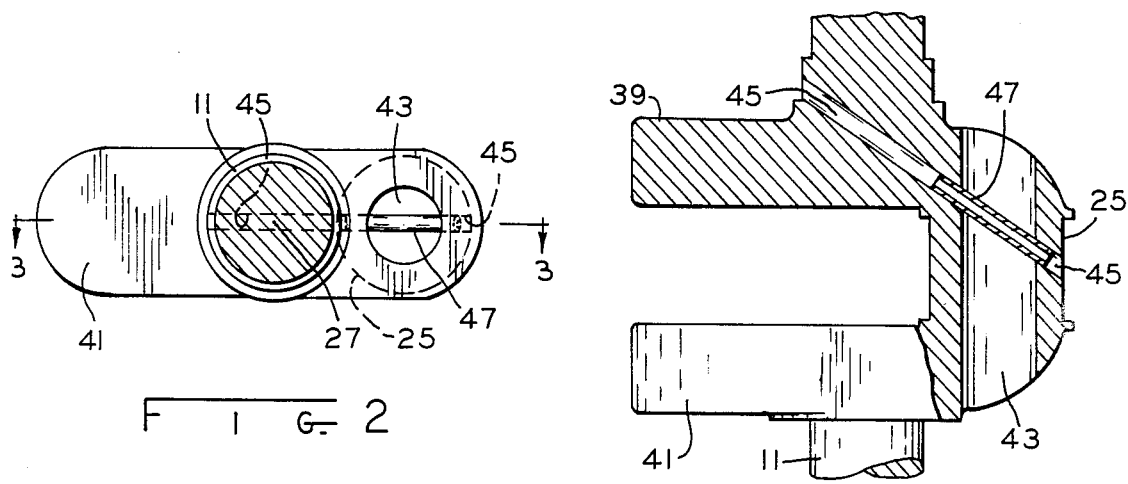
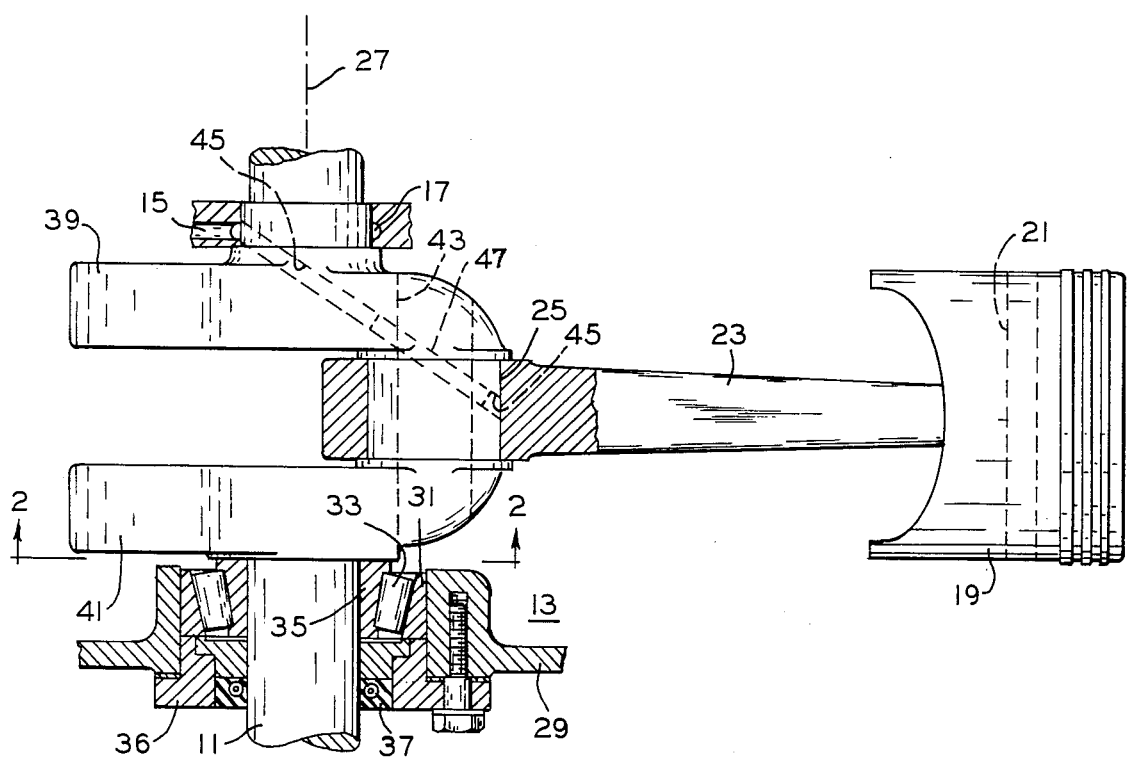

4,768,397

LUBRICATION SCHEME FOR PRESSURE LUBRICATED CRANKSHAFTS WITH COUNTERWEIGHT HOLES FOR CRANKSHAFT BALANCE

BACKGROUND OF THE INVENTION

The present invention relates generally to internal combustion engine construction and more particularly to a crankshaft counterbalancing and lubricating system for an internal combustion engine.

The art of counterbalancing the effect of reciprocating masses in internal combustion engines is quite well established and such counterbalancing is frequently accomplished by providing one or more counterweights eccentrically positioned on the engine crankshaft opposite the eccentric location of the connecting rod crankshaft bearing. In this manner, the reciprocating mass typically including the piston and connecting rod is moving in one direction while the counterweight is moving in the opposite direction so as to tend to cancel out the inertial effects of piston reciprocation. While it is recognized that angular momentum or other imbalance problems remain, these are much less significant than the problems created by the linear motion of the piston and though those problems remain the engine is said to be balanced.

In some engine configurations there is insufficient internal clearance for the moving components to allow the presence of a crankshaft counterweight of sufficient size and location to balance out the reciprocating momentum of the piston to the degree desired by the designer, and in these situations it is known to supplement the effect of the counterweight by removing material from the crankshaft on the side of the crankshaft axis of rotation opposite the counterweight. Thus removing material from one side of the crankshaft has essentially the same effect as adding material to the opposite side of the cranksaft.

Schemes for lubricating bearings and other moving parts within an internal combustion engine are also quite well established. Two stroke cycle engines typically rely on a lubricant being mixed with the fuel and circulated therewith throughout the engine crankcase. Four stroke cycle engines typically employ an engine sump within the crankcase providing a lubricant source and that lubricant, such as common engine oil, may be distributed by splashing around during engine operation. For example, it is fairly commonplace to employ an oil dipper on the lower end of an engine connecting rod so that as the crankshaft rotates the connecting rod periodically dips into the oil in the engine sump, scooping up a dip of that oil for lubricating the crankshaft connecting rod bearing. Other engines may employ a so-called pressure lubricating system wherein an oil pump withdraws lubricant from the sump and distributes that lubricant through a network of lubricant flow paths to the various parts of the engine. For example, in one vertical crankshaft, single cylinder, four stroke cycle engine manufactured by the applicant's assignee, an oil pump is cam shaft actuated to pump oil upwardly through a drilled cam shaft passage to near the top of the engine and then that oil flows laterally into an upper main bearing oil groove for lubricating the upper main crankshaft bearing. That crankshaft also includes a drilled crankshaft passage extending from the main bearing oil groove downwardly to the crankshaft connecting rod journal for lubricating the connecting rod bearing. As the oil leaks away from the connecting rod bearing, it is slung outwardly by centrifugal force in a generally horizontal plane so as to lubricate the piston, wrist pin, cylinder side walls and other components of the engine.

Unfortunately the crankshaft oil passageway of the last mentioned lubricating scheme passes directly through the region which would be cored or removed if one were to attempt the earlier mentioned counterbalancing scheme employing a combination of counterweights and voids. Prior attempts to wed this lubricating scheme and cored counterbalancing scheme have necessitated the relocation of the lubrication passageways in the crankshaft to prevent the counterbalance hole from interrupting the oil passageway. Such relocation is costly in that circuitous lubricating paths must be formed in the crankshaft and is also costly in the sense that the same crankshaft configuration cannot be employed in both counterbored and coreless balancing environments. It would be highly desirable to provide a crankshaft configuration having the advantages of the cored counterbalancing configuration while retaining the advantages of the simplistic linear crankshaft lubricant passageway which extends from the main bearing oil groove obliquely to the crankshaft axis and directly to the crankshaft connecting rod journal.

SUMMARY OF THE INVENTION

Among the several objects of the present invention may be noted the provision of a method for counterbalancing an internal combustion engine while preserving a lubricant flow path for supplying lubricant to a crankshaft connecting rod journal; the provision of a method of counterbalancing an internal combustion engine where insufficient space for a crankshaft counterbalance weight adequate to balance the engine is encountered; the provision of an internal combustion engine crankshaft counterbalancing and lubricating system of the type having opposed counterweights and cored connecting rod journal region for achieving engine balance having an improved lubricant flow path within the crankshaft; and the provision of an engine crankshaft for an engine having a pressure lubrication system of simplistic and economical design. These as well as other objects and advantageous features of the present invention will be in part apparent and in part pointed out hereinafter.

In general, a cylindrical mass of crankshaft material is removed from a region of the engine crankshaft generally coaxial with the connecting rod journal so as to enhance engine balance with the mass removed including a portion of a lubricant passageway to the connecting rod journal and that region is spanned with a lubricant conduit to re-establish the lubricant path to the connecting rod journal.

Also in general and in one form of the invention, counterbalance weights eccentrically located on the engine crankshaft are inadequate to balance the engine and are supplemented by removing mass from the crankshaft in a region opposite the axis of rotation from the weight and a lubricant flow path from a lubricant source to the crankshaft connecting rod bearing is provided through the removed mass region.

Still further in general and in one form of the invention, an improved lubricant flow path within an engine crankshaft includes a linear lubricant passageway extending through the crankshaft oblique to the axis of rotation thereof and intersecting a cored region with a sleeve press fit within the passageway bridging the cored region and providing a direct lubricant path through the crankshaft to a crankshaft bearing.

BRIEF DESCRIPTION OF THE DRAWING

FIG. 1 illustrates a portion of an internal combustion engine including the crankshaft, connecting rod, and piston and incorporating one form of the invention;

FIG. 2 is a view of the crankshaft of FIG. 1 along the lines 2—2; and

FIG. 3 is a vie win cross section along the line 3—3 of FIG. 2.

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Referring now to FIG. 1, there is illustrated a portion of a small internal combustion engine of the type having a vertical crankshaft 11, a pressure lubrication system of, for example, the type where oil is pumped from the sump 13 upwardly through a cam shaft and then across a crankcase oil passageway 15 to a top main bearing oil groove 17. The engine portions illustrated are of a single cylinder engine variety with a conventional piston 19 coupled by way of wrist pin 21 and connecting rod 23 to a connecting rod crankshaft bearing 25 having an axis of rotation parallel to but off-set from the crankshaft's axis of rotation 27. The engine crankcase 29 has a shoulder supporting the outer bearing race 31 in which the main roller bearing 33 and inner bearing race 35 provide a lower main crankshaft bearing arrangement. Of course, a sleeve type bearing might be employed. The crankcase portion 29 also includes a removable cap 36 supporting an oil seal 37. The parts as thus far described are conventional and maybe integrated with other conventional engine components not illustrated to form the complete internal combustion engine.

Counterbalancing of the crankshaft 11 is accomplished by a pair of counterbalances or weights 39 and 41 in conjunction with a counterbored or cored cylindrical region 43 which is void of crankshaft material and which tends to reduce the mass of the crankshaft on the side of the crankshaft axis of rotation 27 opposite the counterweights 39 and 41. Thus counterbalancing of the reciprocating engine motion is accomplished by the joint effect of the weights 39 and 41 and the cored region 43.

As noted earlier, engine oil or other lubricant is supplied from an oil source such as the oil sump 13 by way of an oil pump and lubricant flow path including the crankcase oil passageway 15 to the top main bearing oil groove 17. Such an oil groove may be employed with a sleeve type upper main bearing or other bearings as desired. The lubricant flow path also includes the downwardly sloping hole 45 extending transverse to the crankshaft axis of rotation 27 at an oblique angle thereto and being interrupted by the counterbored region 43. This crankshaft oil passageway 45 continues to both sides of the void 43. To span or bridge the cored region 43, a tubular sleeve 47 is press fit into the hole 45 crossing the counterbalance void 43 to complete the lubricant flow path from the oil source 13 to the crankshaft bearing surface 25. The press fit is achieved by forming the outside sleeve diameter substantially the same as the inside diameter of the remaining portion of the lubricant passageway 45 so that the sleeve will remain in position bridging the void 43.

The crankshaft connecting rod journal or bearing may be of any conventional design. For example, the outer cylindrical surface crankshaft portion of the journal 25 may simply be a smooth steel surface of the crankshaft with connecting rod 23 including a pair of semi-circular bearing portions bolted together about the region 25 of the crankshaft or other more sophisticated journalling arrangements may be employed.

From the foregoing it is apparent that a novel counterbalancing and lubricating scheme has been disclosed meeting the objects and advantageous features set out hereinbefore as well as others and that modifications as to the precise configurations, shapes and details may be made by those having ordinary skill in the art. For example, either horizontal or vertical crankshaft engine varieties with either single or multiple cylinders are amenable to the techniques of the present invention. While the lubricant passageway has been illustrated as sloping downwardly toward the crankshaft connecting rod bearing, this path could take many other forms so long as the sleeve crosses the counterbalancing void to re-establish oil communication between the oil source and bearing. The present invention may be used to enhance balance in a wide vaiety of counterbalancing schemes including counterbalance systems where extra weights rotate in opposite senses at crankshaft speeds as well as the more simplistic counterbalancing scheme illustrated. These as well as other modifications may be made without departing from the spirit of the invention or the scope thereof as set out by the claims which follow.

What is claimed is:

1. In a vertical crankshaft, pressure lubricated, single cylinder internal combustion engine having a crankshaft counterbalancing and lubricating system of the type having opposed counterweights and cored connecting rod journal region for achieving engine balance, an improved lubricant flow path within the crankshaft comprising a linear downwardly sloping lubricant passageway extending from a top main bearing oil groove to the journal through the crankshaft oblique to the axis of rotation of the crankshaft and intersecting the cored region, and a sleeve press fit within the passageway bridging the cored region and providing a direct lubricant path through the crankshaft to the journal.

2. In a pressure lubricated internal combustion engine of the type where crankshaft balancing is achieved by the combined effect of counterweights and voids, a linearly extending lubricant passageway through the crankshaft oblique to the axis of rotation of the crankshaft including a sleeve crossing a counterbalance void to complete a lubricant flow path from the main bearing oil groove to a crankshaft journal bearing surface.

3. The device of claim 2 wherein the engine is of the vertical crankshaft, single cylinder variety, the lubricant passageway sloping downwardly from the top main bearing oil groove to the crankshaft bearing surface.

4. The device of claim 2 wherein the crankshaft bearing surface is a crankshaft connecting rod bearing.

5. The device of claim 2 wherein the sleeve outside diameter is substantially the same as the inside diameter of the remaining portion of the lubricant passageway whereby the sleeve may be press fit in position bridging the void.

* * * * *